United States Patent
Channa et al.

(10) Patent No.: US 11,539,526 B2
(45) Date of Patent: Dec. 27, 2022

(54) METHOD AND APPARATUS FOR MANAGING USER AUTHENTICATION IN A BLOCKCHAIN NETWORK

(71) Applicant: Samsung Electronics Co., Ltd., Gyeonggi-do (KR)

(72) Inventors: Ashok Babu Channa, Bangalore (IN); Abhishek Sharma, Bangalore (IN); Amogha D Shanbhag, Bangalore (IN); Vinay Kumar, Bangalore (IN); Vijaya Kumar Tukka, Banagalore (IN); Deepraj Prabhakar Patkar, Bangalore (IN); Sravana Kumar Karivedala, Bangalore (IN)

(73) Assignee: Samsung Electronics Co., Ltd

( * ) Notice: Subject to any disclaimer, the term of this patent is extended or adjusted under 35 U.S.C. 154(b) by 58 days.

(21) Appl. No.: 16/981,093

(22) PCT Filed: Mar. 6, 2019

(86) PCT No.: PCT/KR2019/002560
§ 371 (c)(1),
(2) Date: Sep. 15, 2020

(87) PCT Pub. No.: WO2019/177298
PCT Pub. Date: Sep. 19, 2019

(65) Prior Publication Data
US 2021/0014064 A1 Jan. 14, 2021

(30) Foreign Application Priority Data

Mar. 15, 2018 (IN) .............................. 201841009595
Jan. 11, 2019 (IN) .............................. 201841009595

(51) Int. Cl.
*H04L 9/32* (2006.01)
*G06F 9/46* (2006.01)
(Continued)

(52) U.S. Cl.
CPC ............ *H04L 9/3231* (2013.01); *G06F 9/466* (2013.01); *H04L 9/0643* (2013.01); *H04L 9/0863* (2013.01); *H04L 9/50* (2022.05)

(58) Field of Classification Search
CPC ................. H04L 9/3231; H04L 9/0643; H04L 9/0863; H04L 2209/38; H04L 63/062;
(Continued)

(56) References Cited

U.S. PATENT DOCUMENTS

| | | | |
|---|---|---|---|
| 8,826,019 B2 | 9/2014 | Shablygin et al. | |
| 9,280,652 B1 | 3/2016 | Bozarth | |
| 10,116,649 B2 * | 10/2018 | Liu | ........................ H04L 63/083 |
| 2017/0034197 A1 | 2/2017 | Daniel et al. | |
| 2017/0111175 A1 | 4/2017 | Oberhauser et al. | |

(Continued)

FOREIGN PATENT DOCUMENTS

| | | | | |
|---|---|---|---|---|
| WO | WO-2014165431 A1 * | 10/2014 | ......... | H04L 63/0281 |
| WO | WO2017044554 | 3/2017 | | |
| WO | WO2018032369 | 2/2018 | | |

OTHER PUBLICATIONS

Daniel Augot et al., "A User-Centric System for Verified Identities on the Bitcoin Blockchain", XP047482992, Sep. 13, 2017, 18 pages.

(Continued)

*Primary Examiner* — Mohammed Waliullah
(74) *Attorney, Agent, or Firm* — The Farrell Law Firm, P.C.

(57) ABSTRACT

Provided is an apparatus for managing user authentication in a blockchain network and the apparatus comprises a processor configured to transmit, to a server, a request for a snapshot identifier (ID) with user data comprising at least one of one-time password, biometric data, context data, routine data, or device metadata, receive the snapshot ID generated based on the user data, initiate a transaction with (Continued)

the snapshot ID in the blockchain network comprising a blockchain server which authenticates the snapshot ID, and output blockchain transaction data associated with the transaction based on the authentication of the snapshot ID.

15 Claims, 16 Drawing Sheets

(51) Int. Cl.
      *H04L 9/06*        (2006.01)
      *H04L 9/00*        (2022.01)
      *H04L 9/08*        (2006.01)

(58) Field of Classification Search
      CPC ............... H04L 63/0876; H04L 63/123; H04L 63/0807; H04L 63/0861; H04L 63/0838; H04L 9/3239; H04L 9/3226; G06F 9/466; H04W 12/04; H04W 12/106; H04W 12/009; H04W 12/068; H04W 12/60
      See application file for complete search history.

(56) References Cited

U.S. PATENT DOCUMENTS

| | | |
|---|---|---|
| 2017/0177855 A1 | 6/2017 | Faidelia et al. |
| 2017/0317997 A1 | 11/2017 | Smith et al. |
| 2017/0324750 A1 | 11/2017 | Khan |
| 2018/0158061 A1* | 6/2018 | Edelstein ............. G06Q 20/322 |

OTHER PUBLICATIONS

Muhammad Ehatisham-ul-Haq et al.,"Authentication of Smartphone Users Based on Activity Recognition and Mobile Sensing", XP055786482, Sep. 6, 2017, 31 pages.
European Search Report dated Mar. 25, 2021 issued in counterpart application No. 19768173.7-1218, 8 pages.
PCT/ISA/210 Search Report issued on PCT/KR2019/002560, pp. 3 (dated Mar. 15, 2018).
PCT/ISA/237 Written Opinion issued on PCT/KR2019/002560, pp. 7 (dated Mar. 15, 2018).

* cited by examiner

[Fig. 1A]
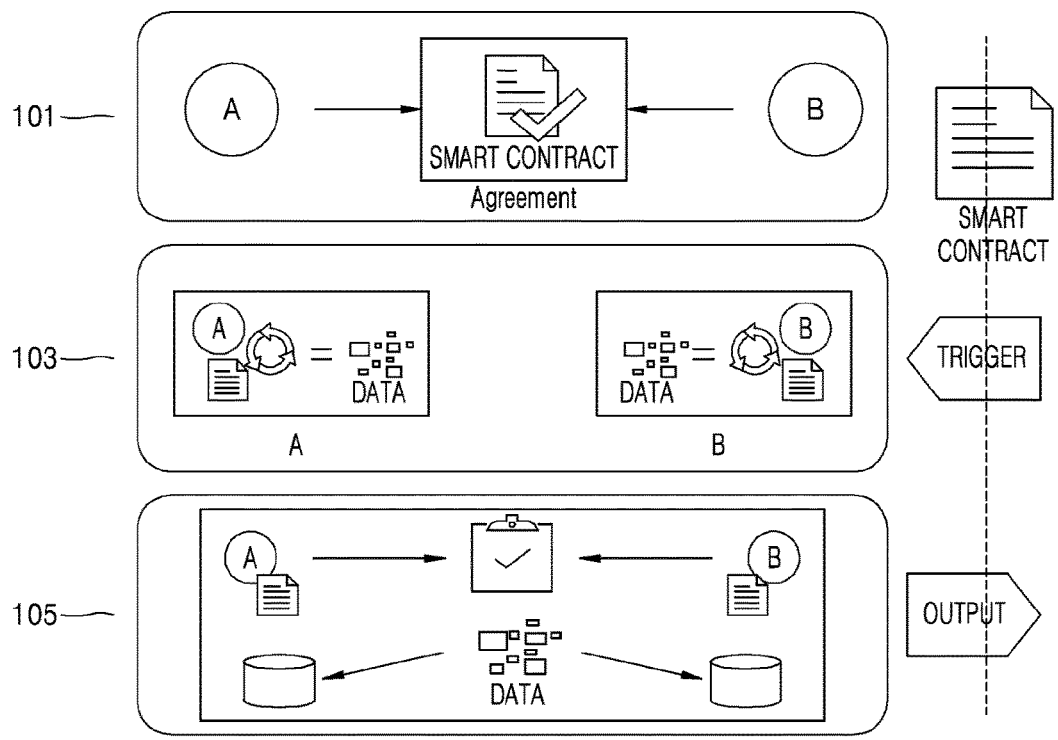
[Fig. 1B]
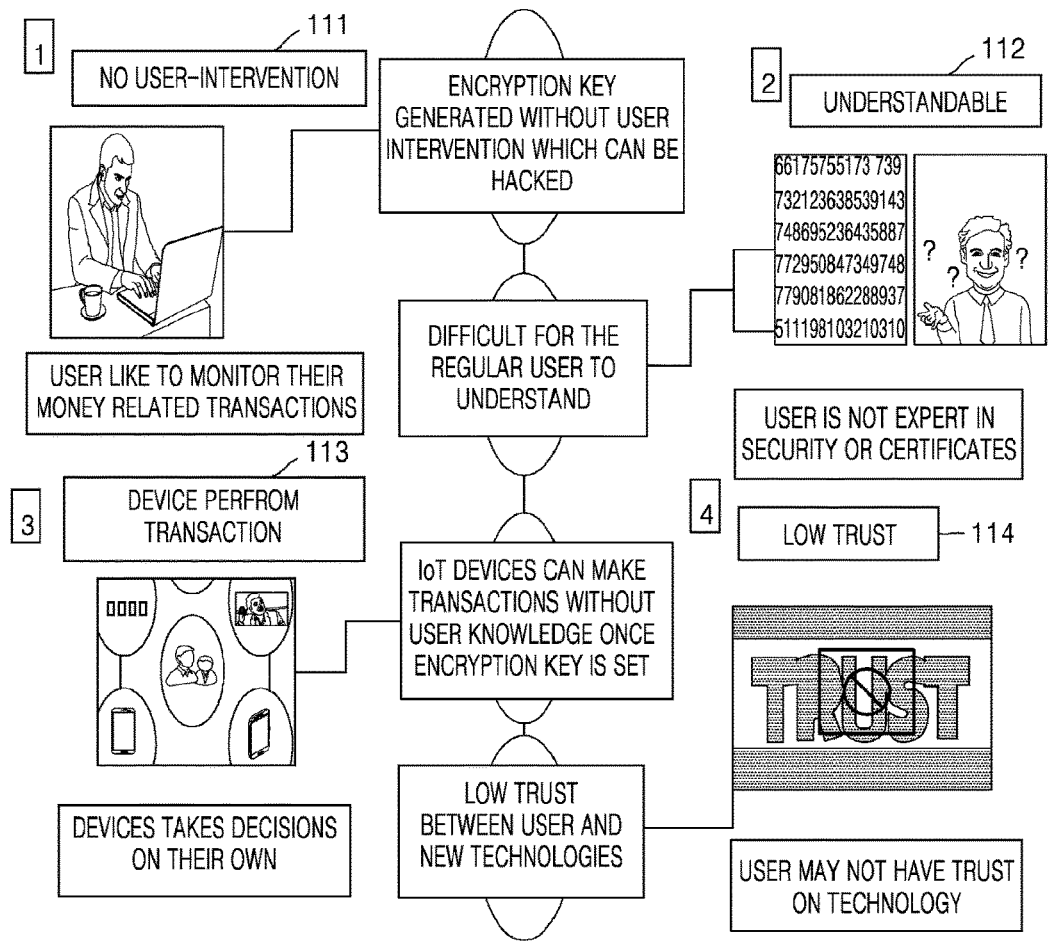

[Fig. 2]
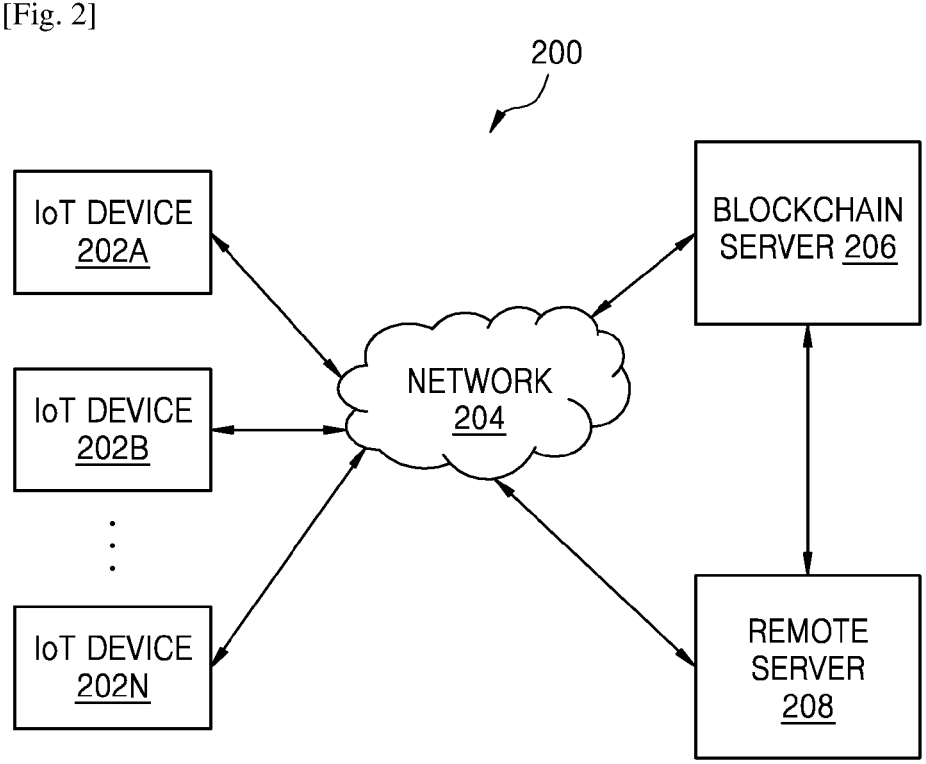

[Fig. 4]
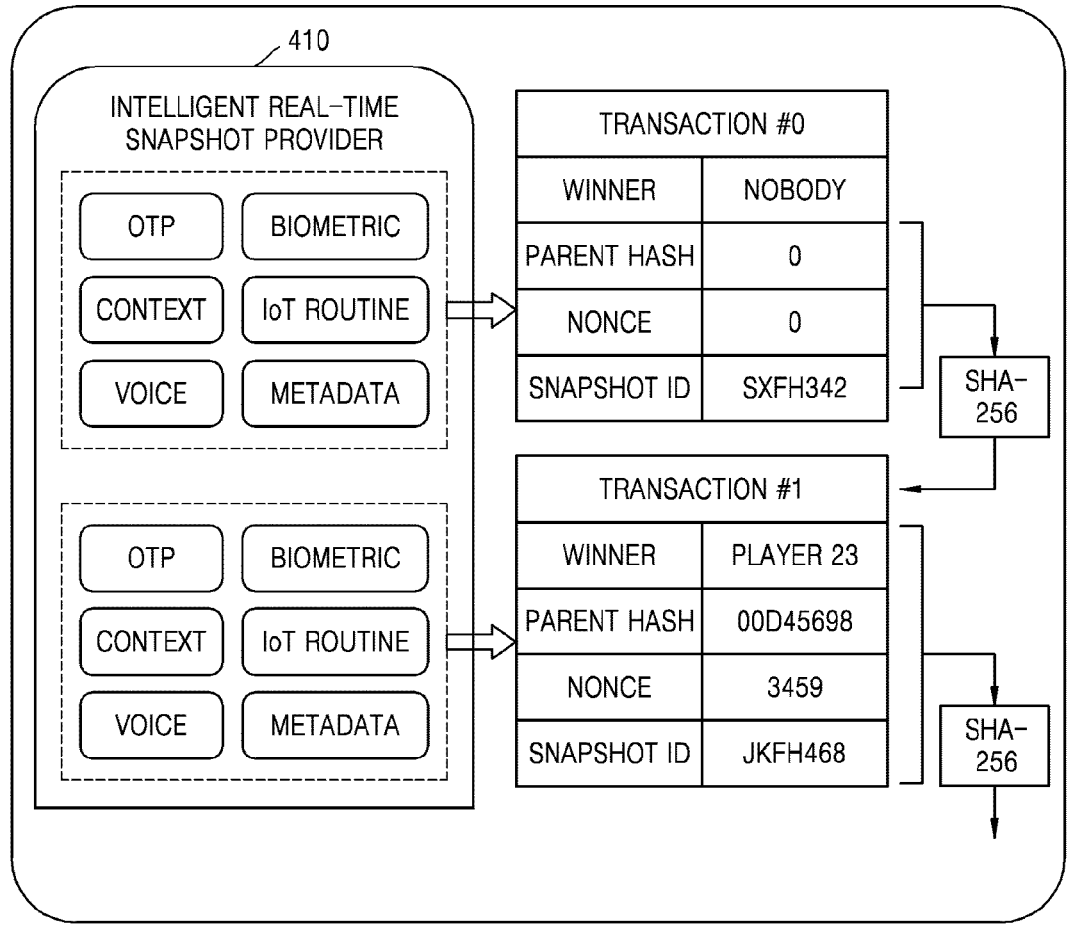
[Fig. 5]
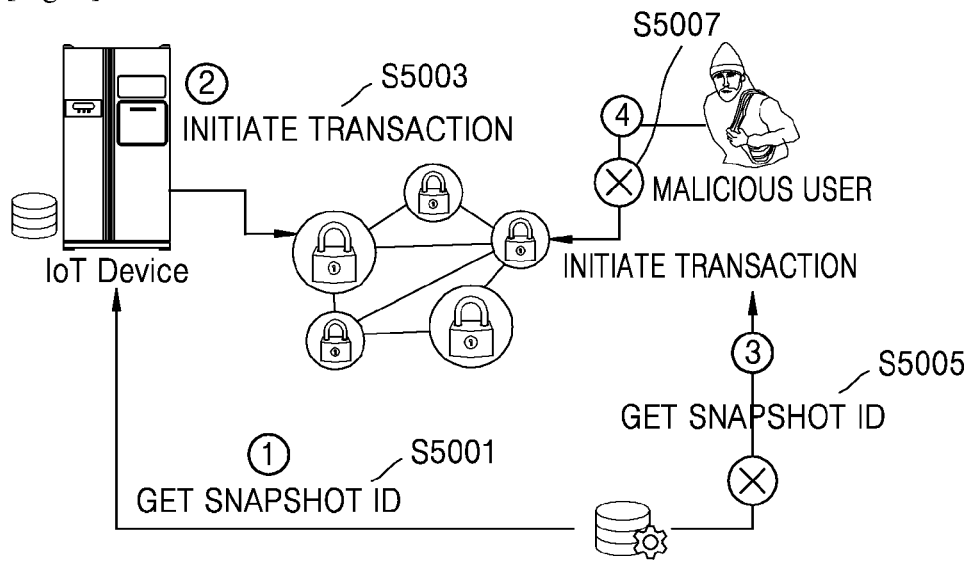

[Fig. 14]
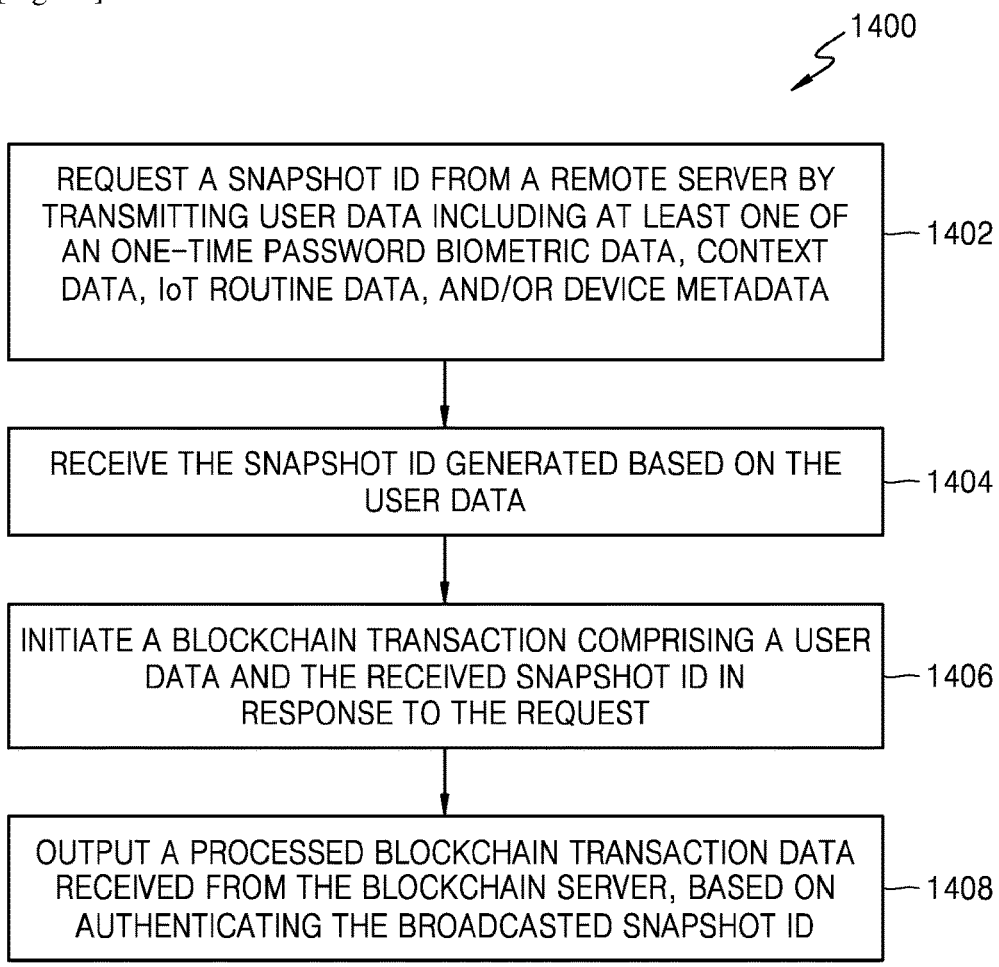
[Fig. 15]
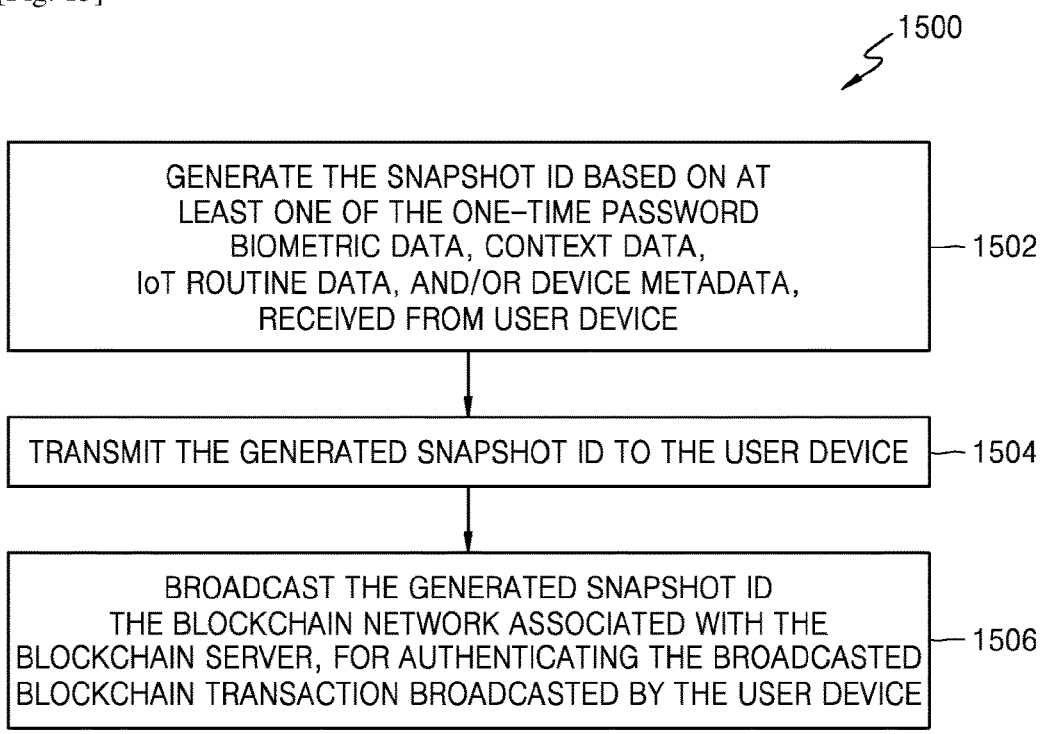

[Fig. 16]
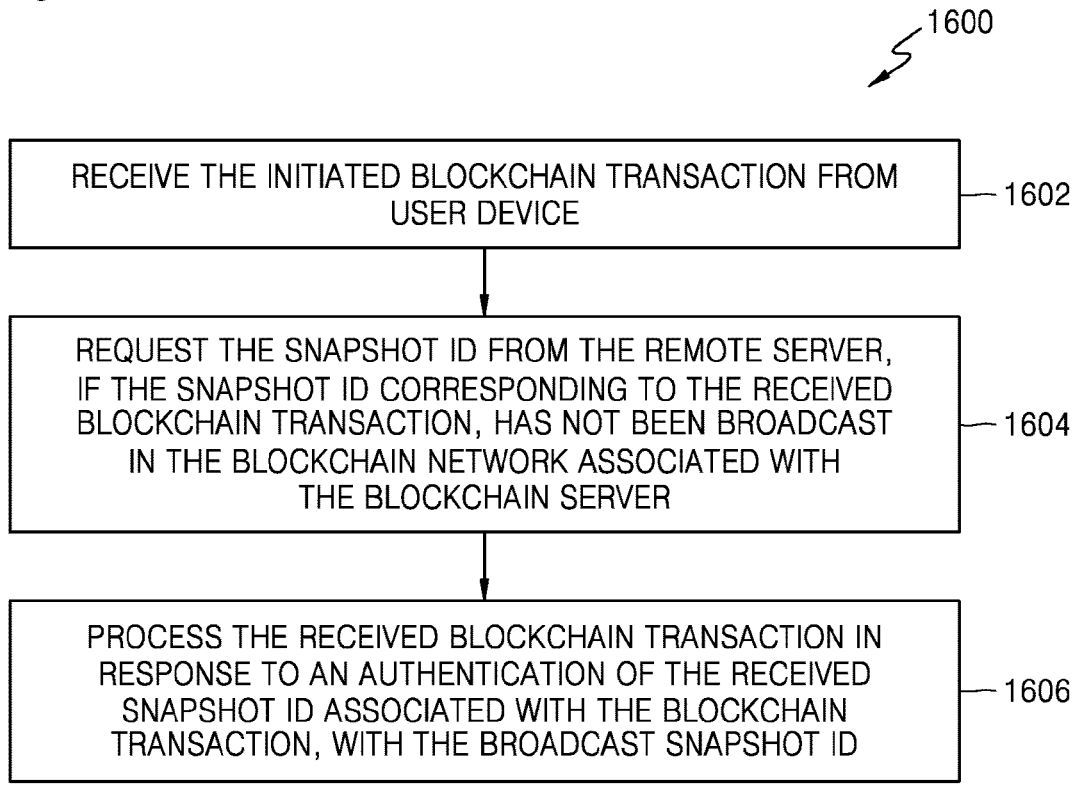
[Fig. 17]
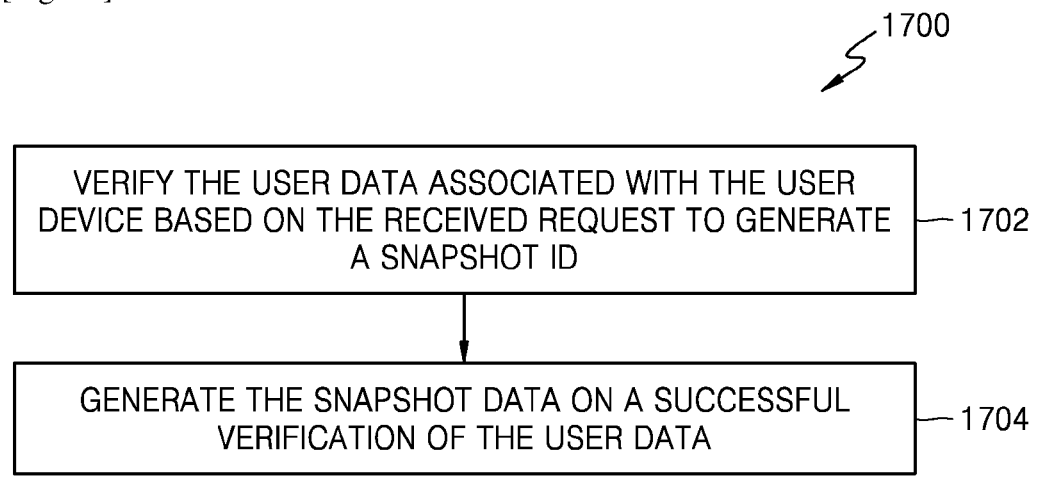

METHOD AND APPARATUS FOR MANAGING USER AUTHENTICATION IN A BLOCKCHAIN NETWORK

PRIORITY

This application is a National Phase Entry of PCT International Application No. PCT/KR2019/002560 which was filed on Mar. 6, 2019, and claims priority to Indian Patent Application Nos. 201841009595 PS and 201841009595 CS, which were filed on Mar. 15, 2018 and Jan. 11, 2019, respectively, the content of each of which is incorporated herein by reference.

TECHNICAL FIELD

The disclosure relates to user authentication. More particularly, the disclosure relates to methods and systems for managing user authentication in a blockchain network.

BACKGROUND ART

A blockchain is an electronic ledger which may be implemented as a computer-based decentralized, distributed system including blocks which in turn are made up of transactions. The transactions may contain small programs known as scripts embedded into the respective inputs and outputs, and the scripts may specify how and by whom the outputs of the transactions can be accessed. Further, subsequent transactions may not be dependent on previous transactions.

FIG. 1A illustrates an example scenario of a blockchain transaction. In particular, referring to FIG. 1A, a smart contract blockchain transaction is performed. In a smart contract transaction, the pre-defined business rules may be subjected to existing rules and regulations edited by a service provider or one of the parties of the agreement in operation 101. The smart contract execution can be triggered by an event on the blockchain network or outside the blockchain network in operation 103. Further, the execution of the smart contract may generate an output which may impact another blockchain (i.e. cash ledger) or another system in operation 105.

FIG. 1B illustrates an example scenario of a blockchain transaction. In particular, a blockchain transaction of FIG. 1B shows a security problem. In operation 111, a user may prefer to monitor the money related transactions. An encryption key may be generated without user intervention. Thus, the encryption key can be hacked. Also, it is difficult for a regular user to understand the encryption key in operation 112. Accordingly, an electronic device may perform transactions and take decisions by itself in operation 113. Also, an IoT (internet of Things) device can perform transactions without user knowledge, once the encryption key is set.

However, the encryption key for the blockchain transaction may not be enough to create a valid transaction. The user may have a low trust in the blockchain technology in operation 114. The user intervention may not be eliminated for all critical transactions (i.e. IoT specific, money transaction, and so on).

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problem

Accordingly, provided is an apparatus for managing user authentication in a blockchain network. The apparatus comprises a processor configured to transmit, to a server, a request for a snapshot identifier (ID) with user data comprising at least one of one-time password, biometric data, context data, routine data, or device metadata, receive the snapshot ID generated based on the user data, initiate a transaction with the snapshot ID in the blockchain network comprising a blockchain server which authenticates the snapshot ID, and output blockchain transaction data associated with the transaction based on the authentication of the snapshot ID.

Advantageous Effects of Invention

The disclosure provides a real time authentication environment for secure transmission of data and improves trust between user and smart systems using block chain technology.

BRIEF DESCRIPTION OF DRAWINGS

Embodiments herein are illustrated in the accompanying drawings, throughout which like reference letters indicate corresponding parts in the various drawings. The embodiments herein will be better understood from the following description with reference to the drawings, in which:

FIG. 1A illustrates an example scenario of a blockchain transaction;

FIG. 1B illustrates an example scenario of a blockchain transaction;

FIG. 2 illustrates a block diagram of a device for managing user authentication in a blockchain network, according to an embodiment of the disclosure;

FIG. 4 illustrates an example snapshot data, according to an embodiment of the disclosure;

FIG. 5 illustrates an example scenario using snapshot ID to initiate any blockchain transaction, according to an embodiment of the disclosure;

FIG. 14 illustrates a flow diagram for managing user authentication using block chain network, according to an embodiment of the disclosure;

FIG. 15 illustrates a flow diagram for broadcasting a snapshot ID to the blockchain network, according to an embodiment of the disclosure;

FIG. 16 illustrates a flow diagram for processing a blockchain transaction, according to an embodiment of the disclosure; and FIG. 17 illustrates a flow diagram for authenticating a snapshot ID, according to an embodiment of the disclosure.

BEST MODE FOR CARRYING OUT THE INVENTION

Figure 3:
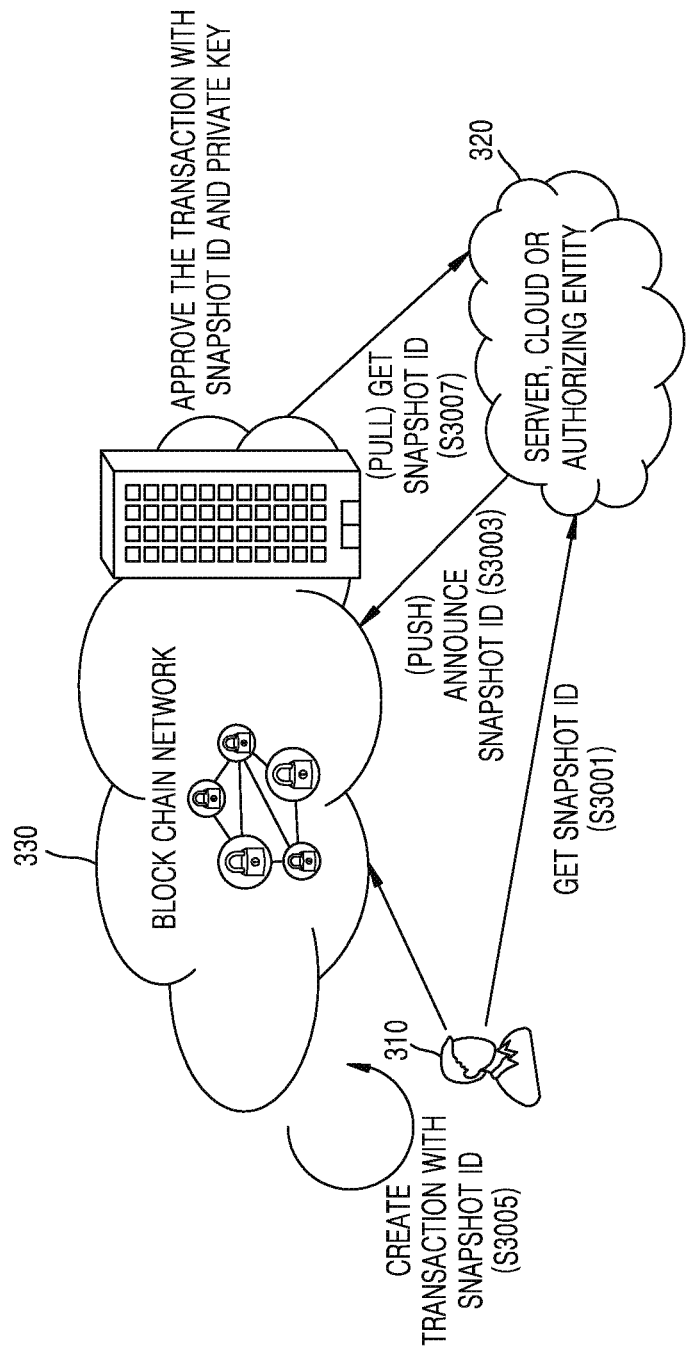
FIG. 3 illustrates a schematic diagram for managing user authentication in a blockchain network, according to an embodiment of the disclosure.

Accordingly, provided is an apparatus for managing user authentication in a blockchain network. The apparatus comprises a processor configured to transmit, to a server, a request for a snapshot identifier (ID) with user data comprising at least one of one-time password, biometric data, context data, routine data, or device metadata, receive the snapshot ID generated based on the user data, initiate a transaction with the snapshot ID in the blockchain network comprising a blockchain server which authenticates the snapshot ID, and output blockchain transaction data associated with the transaction based on the authentication of the snapshot ID.

Accordingly, provided is an apparatus for authentication in a blockchain network. The apparatus comprises a processor configured to receive, from a user device, a request for a snapshot ID and user data comprising at least one of one-time password, biometric data, context data, IoT routine data, or device metadata, generate a snapshot ID based on the user data, transmit the snapshot ID to the user device, and broadcast the snapshot ID to the blockchain server for an authentication.

Accordingly, provided is an apparatus for authentication in a blockchain network. The apparatus comprises a processor configured to receive a first snapshot ID included a blockchain transaction data from a user device, transmit a request for a second snapshot ID to a ledger in the blockchain network, receive the second snapshot ID from the ledger, and determine whether the first snapshot ID corresponds to the second snapshot ID, and authenticate the first snapshot ID based on the determination.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

MODE FOR THE INVENTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein achieve methods and devices for managing user authentication using a blockchain network. Referring now to the drawings, and more particularly to FIGS. 2 through 14, where similar reference characters denote corresponding features consistently throughout the figures, there are shown example embodiments.

FIG. 2 illustrates a block diagram of a device for managing user authentication in a blockchain network, according to an embodiment of the disclosure.

The system 200 includes at least one IoT device 202A-202N, a blockchain server 206, and a remote server 208. Each of the IoT devices 202A-202N may be connected to at least one of the blockchain server 206 and/or the remote server 208 via a network 204. The network 204 may be a wired (such as a local area network, Ethernet, and so on) or a wireless communication network (such as Wi-Fi, Bluetooth, Zigbee, cellular networks, and so on). The system 200 may further include a blockchain network (not shown) and databases (not shown). The blockchain network can be a decentralized, distributed and public digital ledger that may be used to record transactions across the IoT devices 202A-202N, so that the record cannot be altered retroactively without the alteration of all subsequent blocks and the consensus of the network. In an embodiment, the system 200 may be a cloud computing system. The cloud computing system, such as the system 200 can be part of a public cloud or a private cloud. Although not shown, some or all of the devices in the system 200 can be connected to a cloud computing system via a gateway device (not shown). Also, the cloud computing system can be connected to devices located in different geographical locations.

The blockchain server 206 and the remote server 208 may also include a processor, a memory, a storage, input circuitry, output circuitry and a display. The blockchain server 206 and the remote server 208 may be a standalone server or a cloud server. Also, the blockchain server 206 and the remote server 208 may be any kind of computing device such as, but not limited to, a personal computer, a laptop computer, a tablet, a desktop computer, a handheld device, a mobile device, and so on. The blockchain server 206 and the remote server 208 can be a vendor/OEM (Original Equipment Manufacturer) server.

The IoT devices 202A-202N can be, but not limited to, a mobile device, a smart phone, a desktop computer, a laptop, a tablet, a phablet, a wearable computing device, a vehicle infotainment system, a server, an IoT enabled device such as a refrigerator, a washing machine, an air conditioner, a water heater, a smart television, a thermostat, a garage opener, a light source, and so on. The IoT devices 202A-202N may include a user application interface (not shown). The IoT devices 202A-202N may include other components, such as a processor, a memory, a storage, input circuitry, output circuitry, a display and a communication interface respectively. When machine readable instructions are executed, the instructions may cause the IoT devices 202A-202N or the blockchain server 206 to acquire real-time data associated with other IoT devices 202A-202N in the IoT environment. The real-time data may include device information such as device name, manufacturer, unique identifier and/or context of at least one IoT device 202A-202N, a user information, login credentials, and so on.

In an embodiment, the IoT devices 202A-202N can be configured to monitor a plurality of events using camera footage, sensors, and so on. For example, if an unpaired IoT device 202A-202N or a sensor is in the vicinity of a master IoT device which may be one of the IoT devices 202A-202N, then the master IoT device may establish a connection to at least one of the other IoT devices 202A-202N via a secured communication protocol such as HTTP (Hyper Text Transfer Protocols). Also, the master IoT device may initiate a handshake with at least one of the other IoT devices 202A-202N and exchange information such as device capabilities of the at least one of the other IoT devices 202A-202N.

Additionally, the blockchain network may include multiple systems, servers, computers or the like maintained by one or many entities. The blockchain server 206 may interact with many other systems to form the blockchain network. The blockchain network may also be operated by a second entity that is different or separate from a first entity (for example, a financial institution, a third party authentication server, a cloud server, and so on). In an embodiment, the financial institution system(s) may be a part of the blockchain network. The block chain network may include a memory to store at least one of, but not limited to, a transaction program interface and a distributed ledger.

The IoT devices 202A-202N can be configured to use the network 204 to receive information from and/or provide information and commands to other IoT devices 202A-202N, personal computing device (not shown), other financial institution systems (not shown), other blockchain network systems (not shown), and so on. In an embodiment, a digital signature or a snapshot identifier (ID) may be stored on a block of the blockchain network, such as a publicly distributed transaction ledger. Embodiments herein, may further include blockchain module(s) that include one or more components of hardware and/or software program code for accessing and/or utilizing the publicly distributed transactions ledger (i.e. blockchain network) to store and/or view transaction information such as hashed computer readable information and the digital signature, details regarding the source of the computer readable information, metadata of the computer readable information, time details, and the like, using the public key and/or the private key generated and/or stored by the system 200.

Also, blockchain transaction information may be recorded on the publicly distributable transactions ledger such as a blockchain network. The publicly distributable transactions ledger may be a distributed peer-to-peer network, including a plurality of nodes. The ledger may be accessible by the computing system or the IoT devices 202A-202N for verifying, authenticating, completing a transaction, or viewing a transaction details.

In an embodiment, a purpose of the authentication request may include generating relationship (for example, a financial relationship, such as a bank account, brokerage account, credit card account, and/or loan account) with an entity or an institution (such as a commercial institution, an educational institution, a governmental institution, and so on.) associated with the system 200. For example, when the purpose of the authentication request was generating relationship, the result of the authentication request may indicate whether the relationship was created. In another embodiment, when the purpose of the authentication request was providing a service, the result of the authentication request may indicate whether the service was provided. In an embodiment, information related to the authentication request may include additional contact information, demographic information, financial information, and/or similar personal information provided in connection with the authentication request.

In an embodiment, the system 200 may request a snapshot ID from the remote server 208. The snapshot ID may be a computer readable electronic file or a computer readable data. The one of the IoT device among the IoT devices 202A-202N may transmit to the blockchain server 206 or the remote server 208 at least one of authentication data/login credentials (such as one-time password, a biometric data of a user, and so on.), an utterance data, a context data, an IoT routine data, and/or device metadata.

In an embodiment, the biometric data may be collected or generated in relation to physiological characteristics or behavioral characteristics of a user. The biometric data may include, but not limited to, at least one of fingerprint data, veins data, face recognition data, palm printing data, iris data, and/or voice data.

In an embodiment, the system 200 may be configured to initiate a blockchain transaction with a user information and the snapshot ID in response to the request. The user information may include login credentials. In an embodiment, the system 200 may broadcast the initiated blockchain transaction to the blockchain network associated with the blockchain server 206. In an embodiment, the remote server 208 may generate the snapshot ID based on at least one of the one-time password, the biometric data, the context data, the IoT routine data, and/or the device metadata, received from the IoT device 202A-202N. In other words, the snapshot ID may be generated by combining at least one of the one-time password, the biometric data, the context data, the IoT routine data, and/or the device metadata with any random number or a hash value. In an embodiment, the remote server 208 may transmit the generated snapshot ID to at least one of the IoT devices 202A-202N for initiating a blockchain transaction. In an embodiment, the tone of the IoT devices 202A-202N may broadcast the snapshot ID to the blockchain network associated with the blockchain server 206. The remote server 208 may broadcast the snapshot ID to the blockchain network associated with the blockchain server. In an embodiment, the system 200 is configured to compare the snapshot ID broadcast from the IoT device 202A-202N with the snapshot ID from the remote server 208 for authenticating the broadcasted blockchain transaction broadcasted by the IoT device 202A-202N.

In an embodiment, the system 200 is configured to receive the broadcasted blockchain transaction from the IoT device 202A-202N, to perform the blockchain transaction. In an embodiment, the system 200 may request the snapshot ID from the remote server 208, if the snapshot ID corresponding to the received blockchain transaction has not been broadcasted in the blockchain network associated with the blockchain server 206. In an embodiment, the system 200 may process the received blockchain transaction in response to the authentication of the received snapshot ID associated with the blockchain transaction, with the broadcasted snapshot ID.

In an embodiment, the system 200 may determine a preferred authentication mode using the device metadata. Examples of the device metadata can be, but not limited to, at least one of an image data, a call history, an email(s), a subscription data, an online shopping pattern data, and/or unlock pattern data. In an example herein, the authentication mode can be a two factor authentication. In the determined authentication mode, the remote server 208 may verify the user information associated with the IoT device 202A-202N, based on the received request to generate the snapshot ID. In an embodiment, the remote server 208 may output the snapshot ID in response to successful authentication.

In an embodiment, the blockchain server 206 and the blockchain network associated with the blockchain server 206 includes a decentralized distributed ledger. In an embodiment, the remote server 208 includes a hyper ledger to dynamically generate the snapshot ID. In an embodiment, the IoT routine data comprises behavioral pattern of the user with one or more IoT devices 202A-202N during a particular time stamp. In an embodiment, processing the received blockchain transaction may include granting at least one of an access to use IoT device 202A-202N, an access to use service(s), an access to data/information, an access to make payment(s), an access to shop, an access to subscribe to services, an access for financial transactions, and so on.

FIG. 2 illustrates functional components of the computer implemented system. In some cases, the component(s) of the device may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be network connections spanning long distances. Each embodiment may use different hardware, software, and interconnection architectures to achieve the desired functions.

The software may include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

FIG. 3 illustrates a schematic diagram for managing user authentication in a blockchain network, according to an embodiment of the disclosure.

Referring to FIG. 3, at least one IoT device 301 among the IoT devices 202A-202N may pull (i.e. obtain) the snapshot ID from the remote server 208 or an authorizing entity 320 in operation S3001. The remote server 208 or an authorizing entity 320 may push (i.e. announce or broadcast) the snapshot ID to the blockchain network 330 in operation S3003. The at least one IoT device 301 among the IoT devices 202A-202N may generate a blockchain transaction along with the snapshot ID in operation S3005. The blockchain network 303 or blockchain server 206 may pull (i.e. obtain) the snapshot ID corresponding to the received blockchain transaction to authenticate the received snapshot ID in operation S3007. The blockchain transaction may be approved by the blockchain network 330 or the blockchain server 206 once the authentication is successful.

FIG. 4 illustrates an example snapshot data, according to an embodiment of the disclosure. For each transaction, the snapshot ID is generated as referring to the FIG. 4. The intelligent real-time snapshot provider 410 may generate the snapshot ID with user data including at least one of one-time password (OTP), biometric data, user's voice data, context data, IoT routine data, or device metadata. The intelligent real-time snapshot provider 410 may be a hyper ledger. The snapshot ID may include, but not limited to, certificates, encryption keys, user information, device metadata, context data, and/or credentials.

FIG. 5 illustrates an example scenario using snapshot ID to initiate any blockchain transaction, according to an embodiment of the disclosure. In an example, the IoT device 202A-202N may obtain the snapshot ID in operation S5001. The IoT device 202A-202N may initiate the blockchain transaction with the snapshot ID in operation S5003. By contrast, a malicious user such as a hacker may not be able to obtain the snapshot ID in operation S5005. Thus, the malicious user may not complete the blockchain transaction because he or she does not have the snapshot ID in operation S5007.

Figure 6:
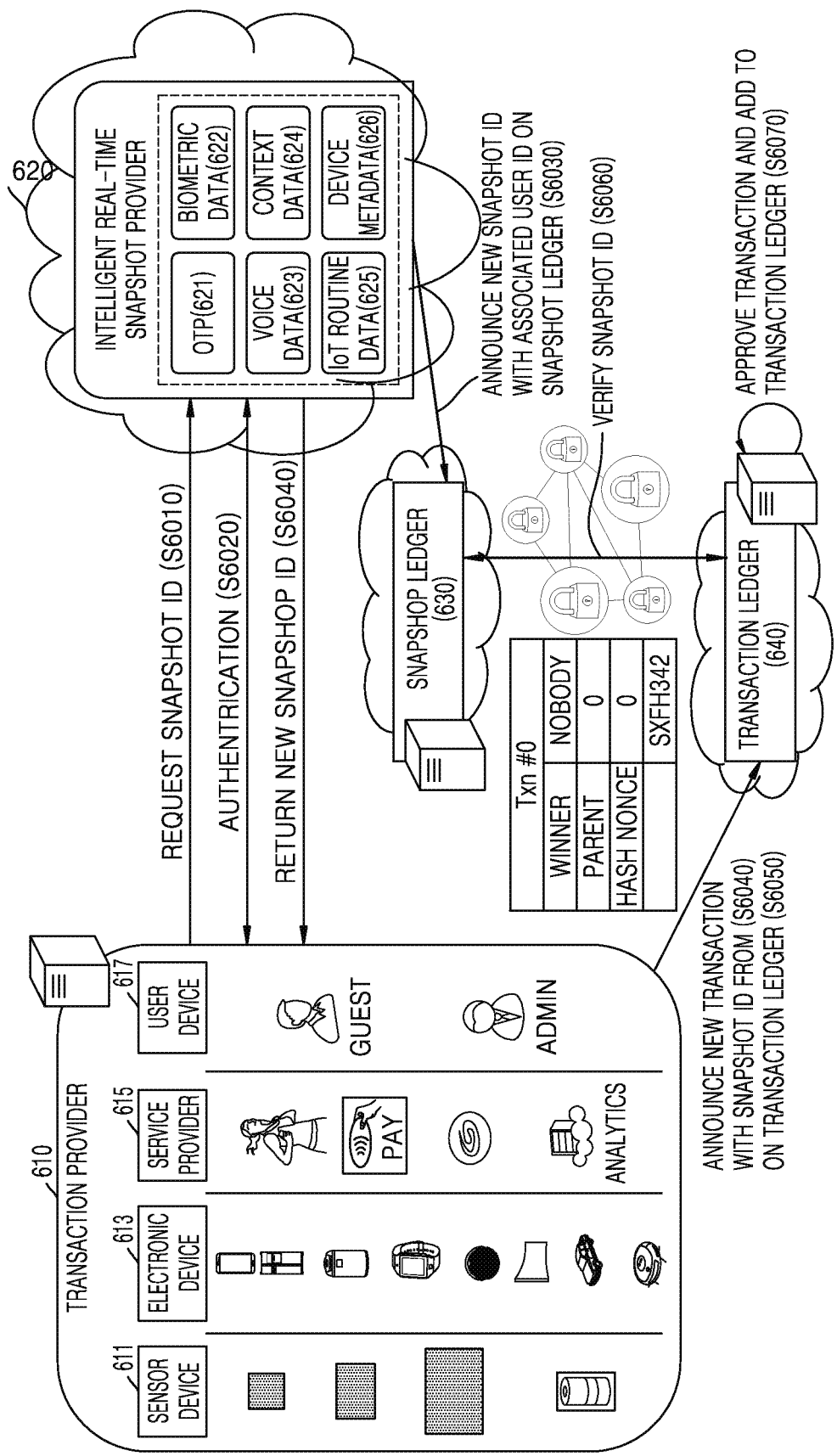
FIG. 6 illustrates an example diagram for approving block chain transactions, according to an embodiment of the disclosure.

FIG. 6 illustrates an example diagram for approving block chain transactions, according to an embodiment of the disclosure. The transaction can be initiated by transaction provider 610. The transaction provider may be at least one of, but not limited to, a sensor device 611, an electronic device 613, a service provider 615, a user device 617, and/or the IoT devices 202A-202N. In operation S6010, the transaction provider 610 may request the snapshot ID for the transaction to be initiated. In operation S6020, an intelligent real-time snapshot provider 620 (e.g. the remote server 208) may authenticate the transaction provider 610 in response to the request. The intelligent real-time snapshot provider 620 may generate the snapshot ID with user data including at least one of one-time password (OTP) 621, biometric data 622, user's voice data 623, context data 624, IoT routine data 625, or device metadata 626. In an embodiment, the snapshot ID may be generated by adding hash value or random number to the user data or by encrypting the user data with an encryption key. The user data may be transmitted to the intelligent real-time snapshot provider 620 separately from or simultaneously with the request of the snapshot ID. In operation 6030, the intelligent real-time snapshot provider 620 may announce or broadcast the generated new snapshot ID on a snapshot ledger 630 (e.g. blockchain network). The announcement may be made along with the associated user data. In operation S6040, the intelligent real-time snapshot provider 620 may transmit the generated new snapshot ID to the transaction provider 610. In operation S6050, the transaction provider 610 may announce or broadcast a new blockchain transaction with the obtained new snapshot ID on a transaction ledger 640 (e.g. a blockchain network or the blockchain server 206). The transaction provider 610 may output, based on the authentication of the snapshot ID, a blockchain transaction data associated with the transaction to the blockchain network along with the announcement. In operation S6060, the transaction ledger 640 may verify the new snapshot ID associated with the transaction provider 610. In operation S6070, the blockchain transaction is approved and added to the transaction ledger 640, if the new snapshot ID is verified and/or matched successfully.

Figure 7:
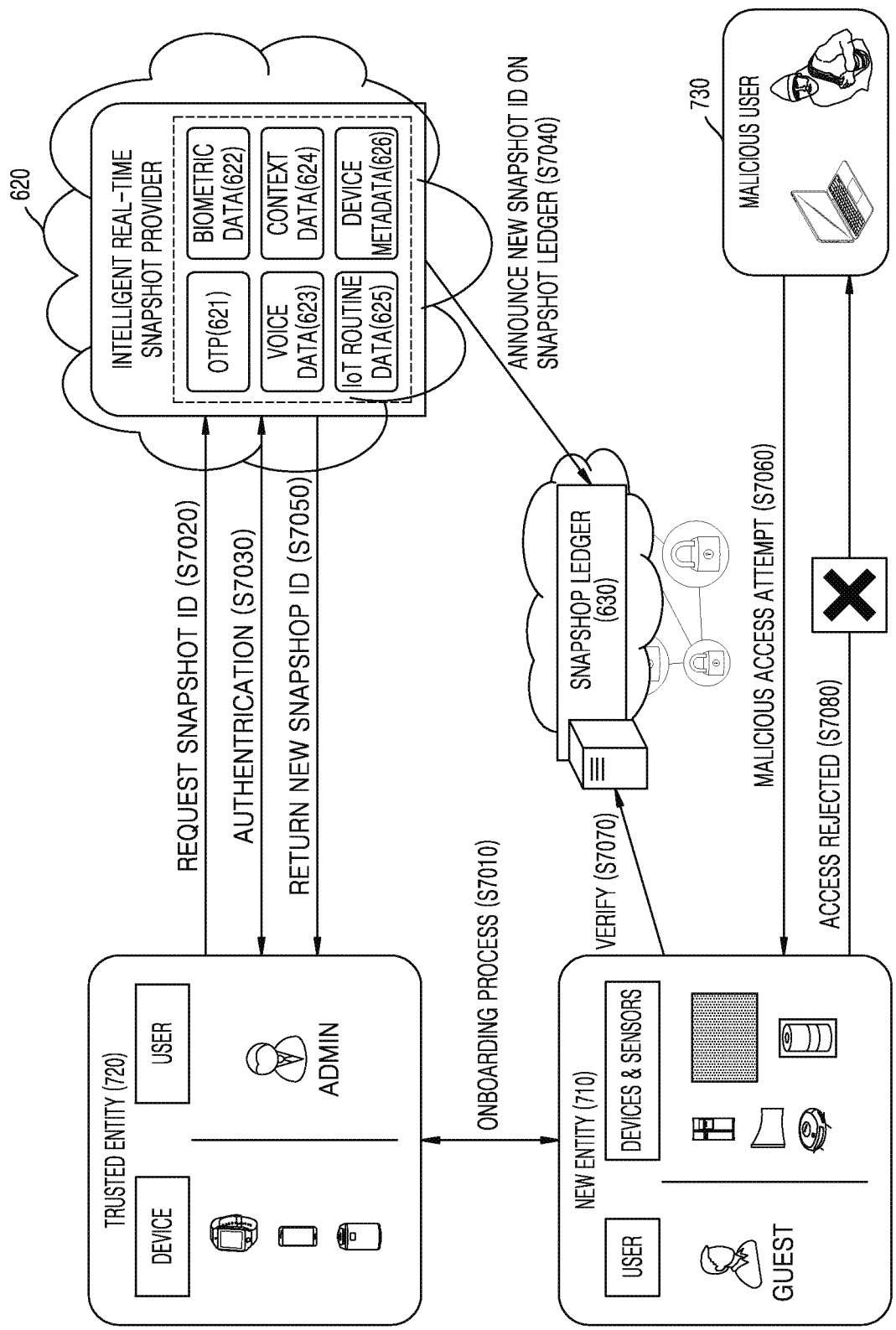
FIG. 7 illustrates an example diagram for approving block chain transaction, according to an embodiment of the disclosure.

FIG. 7 illustrates an example diagram for approving block chain transaction, according to an embodiment of the disclosure. In operation S7010, the new entity 710 including, not limited to, a guest user, devices or sensors may be on-boarded to the existing trusted network environment where the existing trusted network environment may include at least one trusted entity 720. In an embodiment, the network environment may be IoT environment including the IoT devices 202A-202N. In operation S7020, the trusted entity 720 may request a new snapshot ID from a intelligent real-time snapshot provider 620 (e.g. the remote server 208 or any other entity). In operation S7030, the intelligent real-time snapshot provider may authenticate the trusted entity 720 and the new entity device 710. In operation S7040, the intelligent real-time snapshot provider 620 may broadcast or announce the generated new snapshot ID to the snapshot ledger 630 (i.e. a blockchain network or the blockchain server 206) along with the new snapshot ID, an entity ID of the new entity 710, and/or a user ID of the trusted entity 720. In operation S7050, the generated new snapshot ID may be transmitted to the trusted entity 720. In operation S7060, a malicious user such as a hacker may attempt to access the new entity 710. In operation S7070, the attempt of accessing the new entity 710 may be rejected due to the verification result. In other words, the verification result will be negative because the malicious user does not have the snapshot ID. In operation S7080, based on the verification result, an access by the malicious user to the new entity 710 may be rejected.

Figure 8:
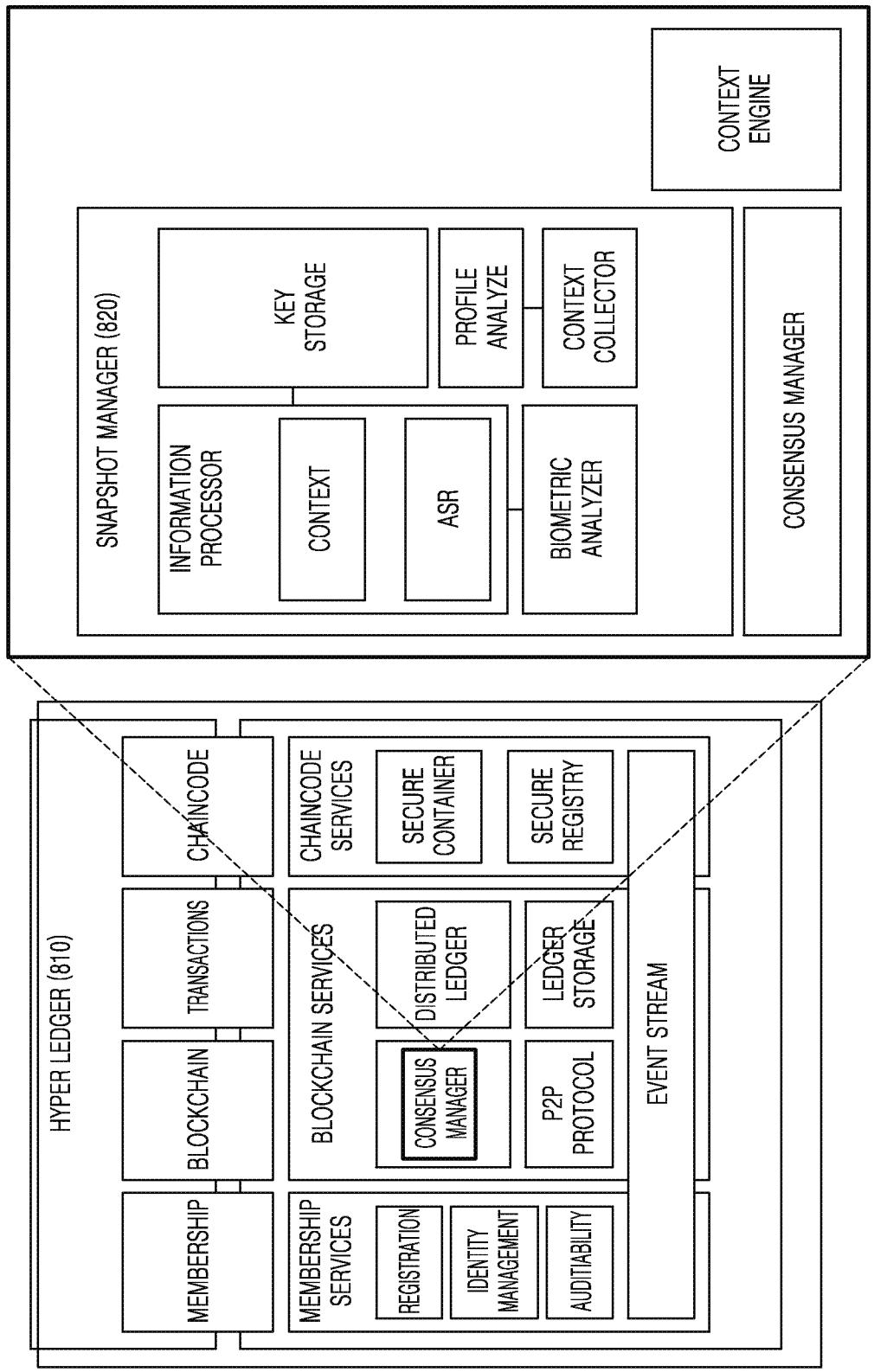
FIG. 8 illustrates a block diagram for snapshot manager for managing the user authentication in a blockchain network, according to an embodiment of the disclosure.

FIG. 8 illustrates a block diagram for snapshot manager for managing the user authentication in a blockchain network, according to an embodiment of the disclosure.

A snapshot manager 820 in the hyper ledger 810 may dynamically generate the snapshot ID based on user data. The snapshot manager 810 may announce or broadcast the generated snapshot ID with user data.

Figure 9A:
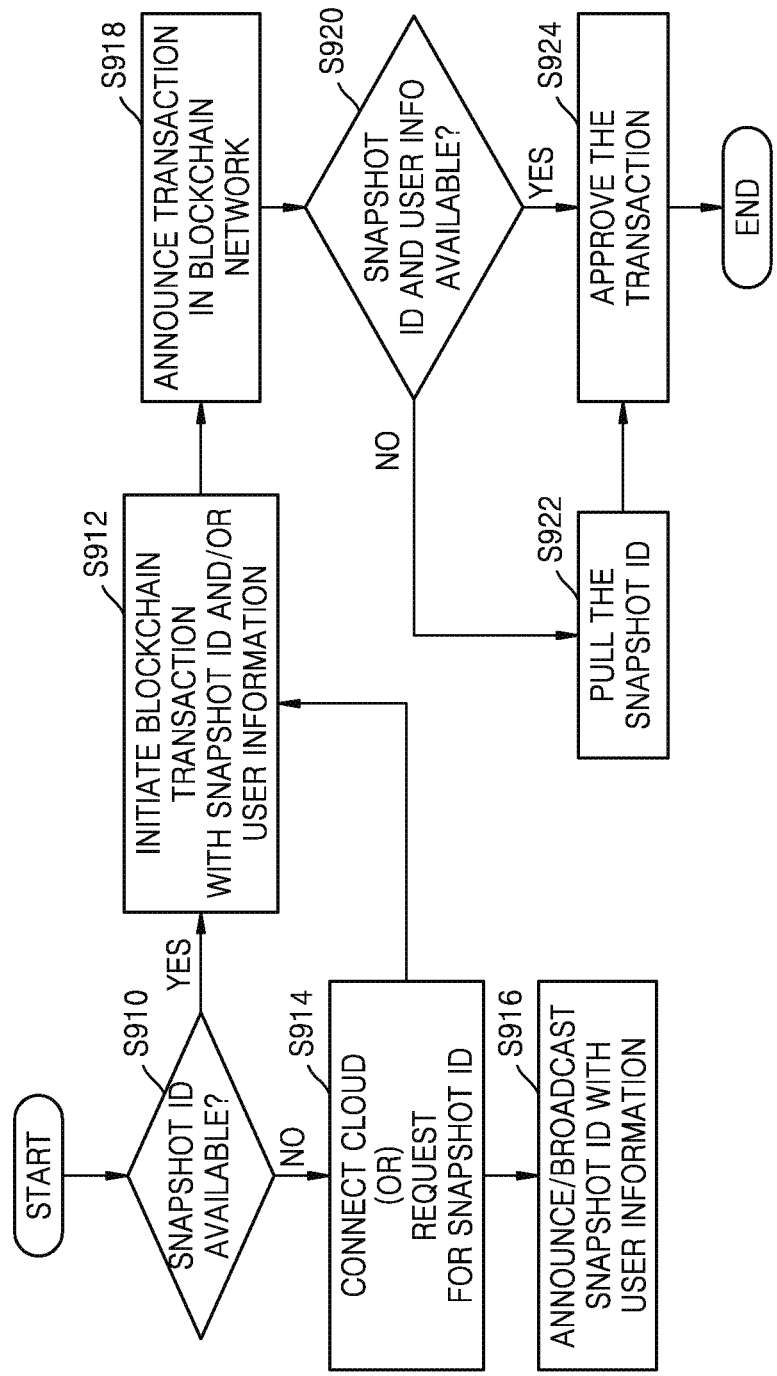
FIG. 9A illustrates a flow diagram for approving blockchain transaction, according to an embodiment of the disclosure.

FIG. 9A illustrates a flow diagram for approving blockchain transaction, according to an embodiment of the disclosure. In operation S910, a user device checks if a snapshot ID is available at the user device. In an embodiment, the user device may be the IoT device 202A-202N. In operation S912, if it is determined that the snapshot ID is available at the IoT device 202A-202N, a new blockchain transaction is initiated using the snapshot ID. If the snapshot ID is not available, a request for the snapshot ID is transmitted to the remote server 208 or intelligent real-time snapshot provider 620 in operation S914. In operation S916, the generated snapshot ID is announced or broadcast to the blockchain network, by the remote server 208. In operation S918, the user device may announce or broadcast the blockchain transaction to the blockchain network. In operation S920, in response to the announcement of the blockchain transaction, the blockchain network may verify the snapshot ID by determining whether the snapshot ID of the user device matches a snapshot ID announced by the remote server 208 or the intelligent real-time snapshot provider 620. The blockchain network may block the blockchain transaction, if the snapshot ID is not previously broadcast or announced in the blockchain network. In operation S922, the blockchain network may pull the snapshot ID from before rejecting or blocking the blockchain transaction. In operation S924, the blockchain transaction is approved if the snapshot ID is verified or matched with the announced snapshot ID.

Figure 9B:
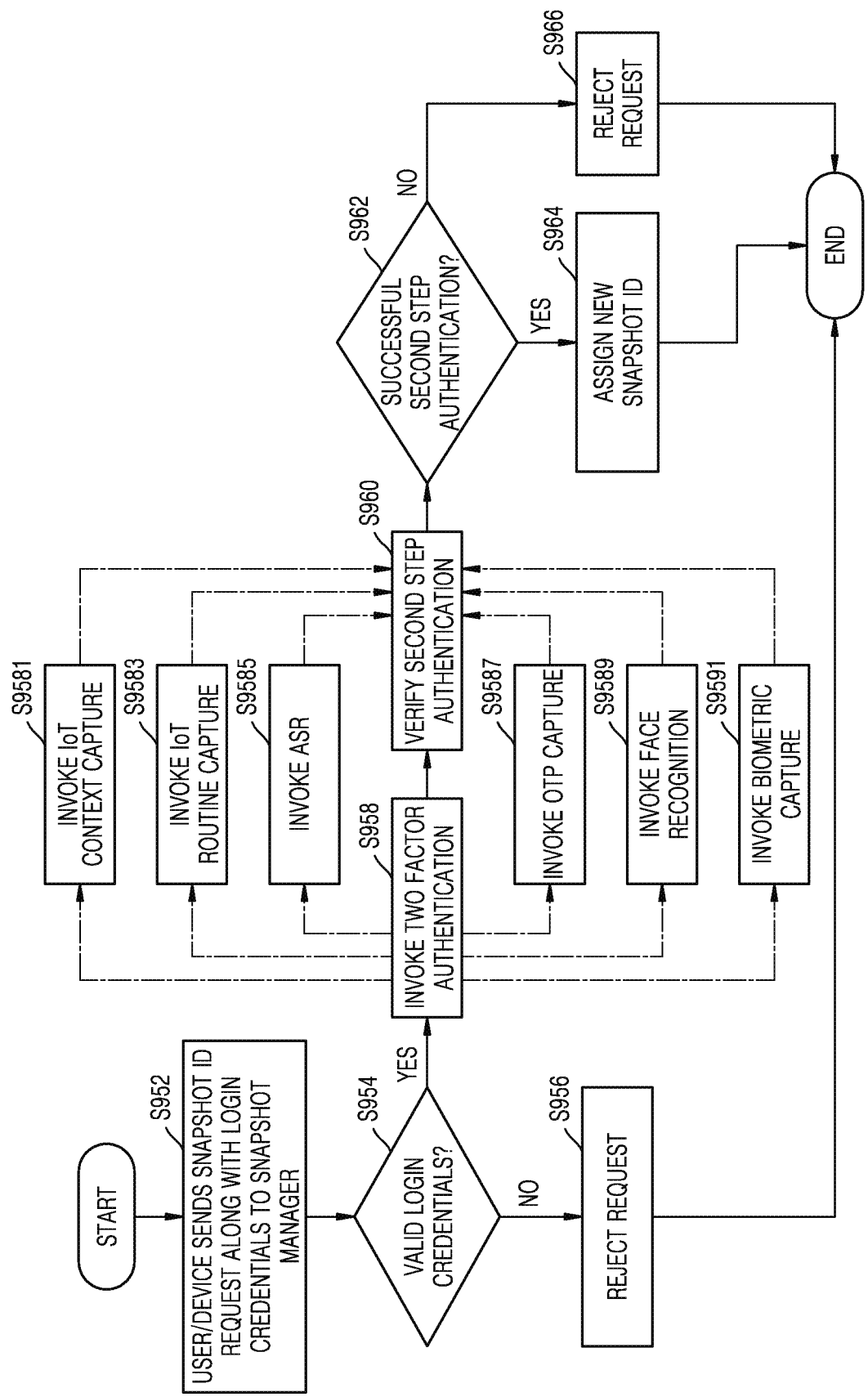
FIG. 9B illustrates a flow diagram for the blockchain transactions by the remote server, according to an embodiment of the disclosure.

FIG. 9B illustrates a flow diagram for the blockchain transactions by the remote server, according to an embodiment of the disclosure. In operation S952, a user device such as at least one of the IoT devices 202A-202N may transmit a request for a snapshot ID, along with user data including, but not limited to, user login credentials to the remote server 208 or the snapshot manager 820. In operation S954, the remote server 208 or the snapshot manager 820 may verify the user login credentials. In operation S956, the remote server 208 or the snapshot manager 820 may reject the request if the login credentials fail to be authenticated. In operation S958, two factor authentication may be invoked, if the login credentials are valid and the two factor verification may be performed based on invoking the preferred two factor authentication method. For example, the two factor authentication method may comprise invoking IoT context capture, invoking IoT routine capture and so on. In operation S960, the second step authentication is performed. If the second step authentication associated with the two factor authentication is successful in operation S962, a new snapshot ID is assigned to the IoT device 202A-202N in operation S964. Otherwise, the request is rejected in operation S966.

Figure 10:
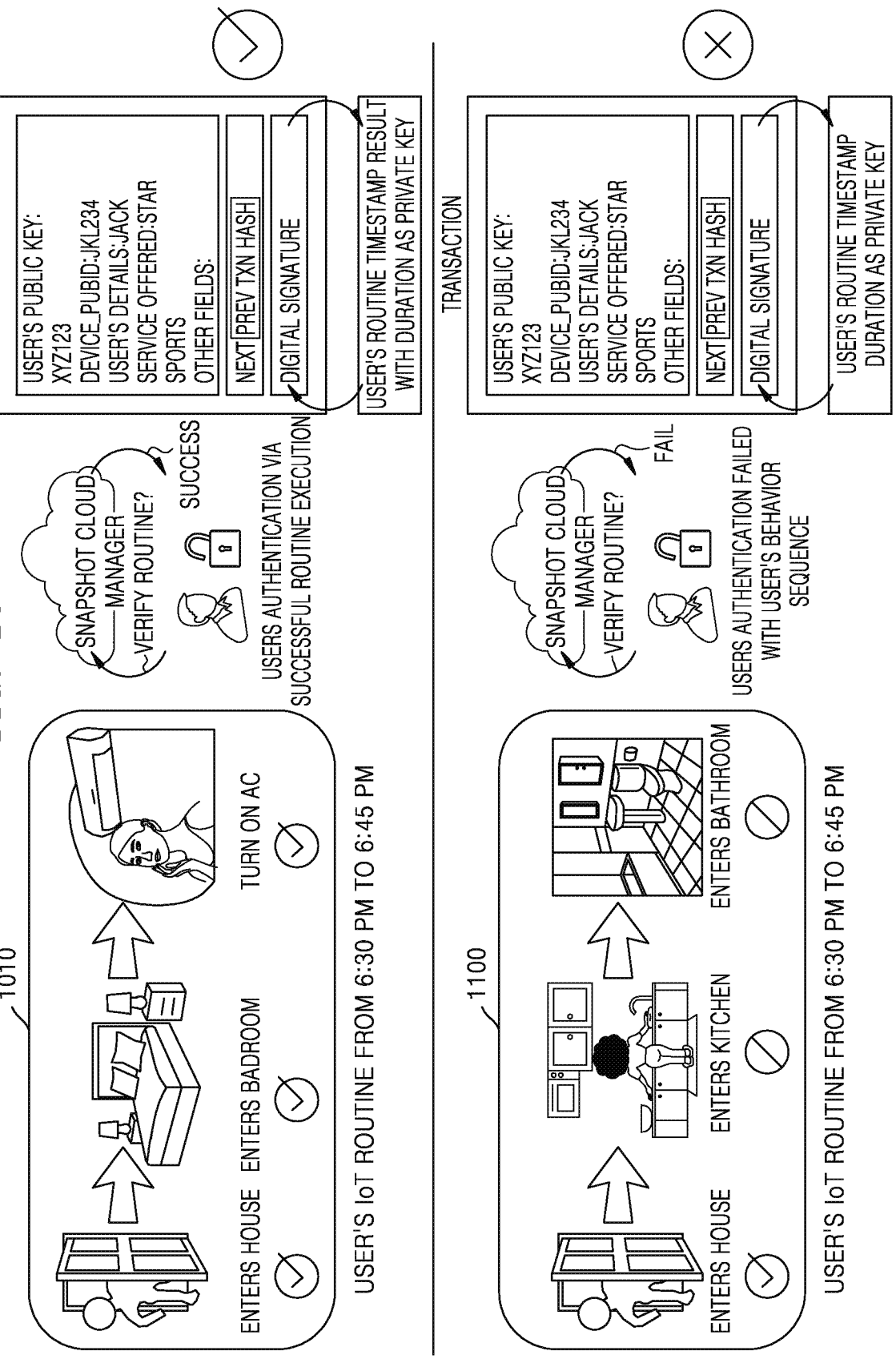
FIG. 10 illustrates an example scenario using user authentication in a blockchain network, according to an embodiment of the disclosure.

FIG. 10 illustrates an example scenario using user authentication in a blockchain network, according to an embodiment of the disclosure. In an embodiment, the user of the IoT device 202A-202N may enter a bedroom as soon as the user enters house, according to the user's IoT routine. The air conditioner in the bedroom may be turned ON if the user's IoT routine during a designated period of time is authenticated successfully in operation 1010. By contrast, if the user shows an irregular IoT routine/pattern, an access to the bathroom may be denied in operation 1100. The irregular IoT routine may be, for example, entering kitchen after entering the house as illustrated in FIG. 10. The IoT routine may be stored as IoT routine data by collecting routine information regarding the route of the user in a predetermined area, patterns of operating or executing user's devices in a predetermined sequence, and so on. The IoT routine data may be transmitted and used to assist the remote server 208 to generate a snapshot ID.

Figure 11:
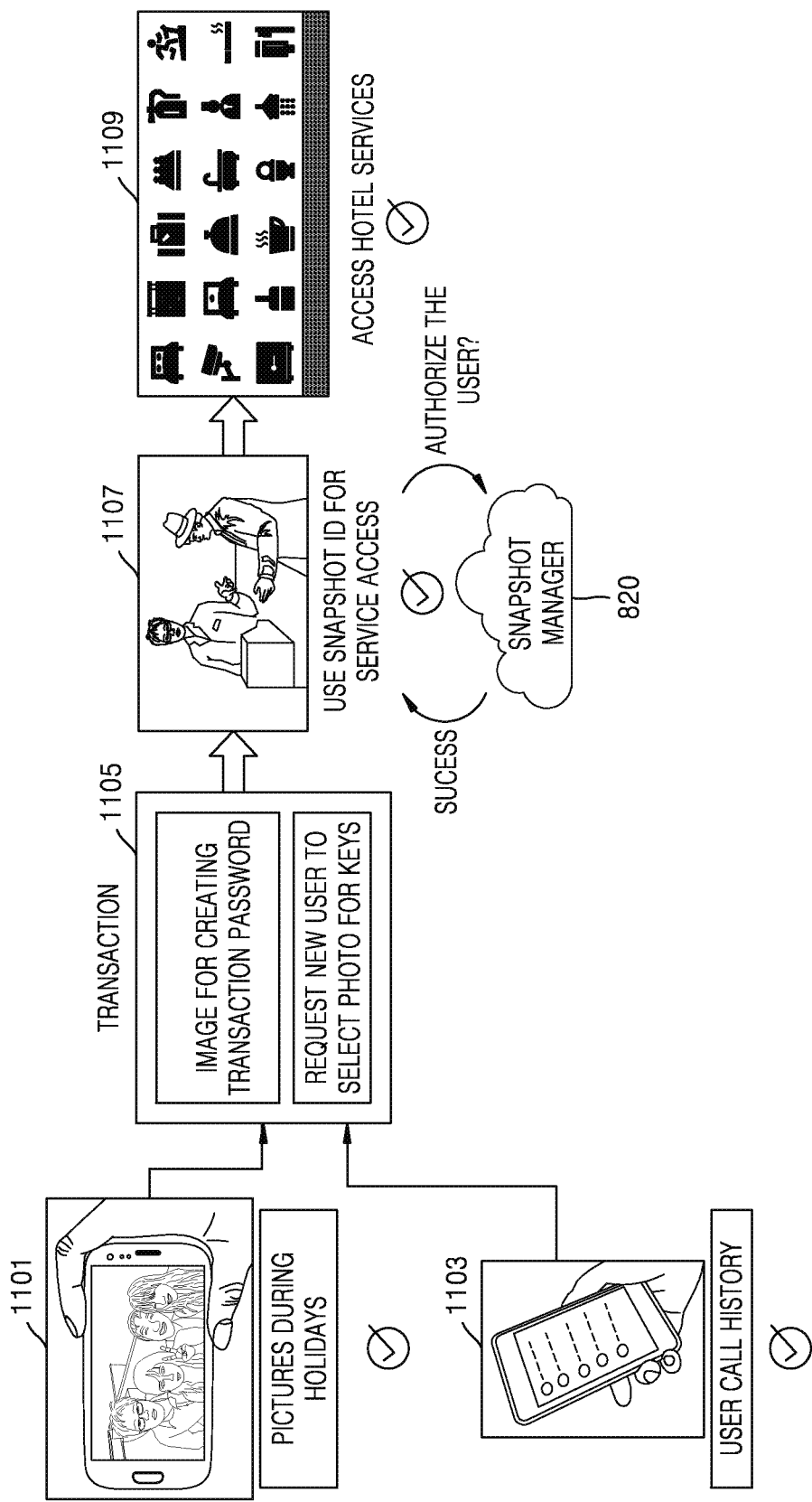
FIG. 11 illustrates an example scenario using user authentication in a blockchain network, according to an embodiment of the disclosure.

FIG. 11 illustrates an example scenario using user authentication in a blockchain network, according to an embodiment of the disclosure. In operation 1101, when a user is traveling, the user may take or capture various still and/or moving pictures. The pictures may reflect a lot of information such as the location where the picture is taken, the name of the place or the landmark. In another embodiment, still pictures and/or moving pictures, usage pattern data of the device, applications usage pattern data in the user device may be recorded at the user device as context data. In operation 1105, the user may select at least one of the pictures taken or stored in the user device. The selected picture may be used as context data which may be transmitted to the remote server 208 along with or separately from a request for a transaction ID. A snapshot ID as the transaction ID may be generated by the remote server 208, based on the selected picture.

In another embodiment, the remote server 208 may, after receiving a request for a snapshot ID from at least one of IoT devices 202A-202N, request context data. The remote server 208 may request user credential information other than the context data. The user credential information may include, but not limited to, user login ID (login ID for IoT devices or login ID for SNS service), user's physiological data such as fingerprint data, iris data, voice data, veins data, and/or face recognition data, and IoT routine data. The user credential information may be transmitted to the snapshot manager 820 or the remote server 208. The remote server 208 or the snapshot manager 820 may generate the snapshot ID with the context data and/or the user credential information.

The at least one of IoT devices 202A-202N may receive the generated snapshot ID from the remote server 208. In operation 1107, when the user initiates a blockchain transaction of accessing the hotel service with the received snapshot ID stored in the user's device, the initiated blockchain transaction may be approved based on the verification of the snapshot ID and the user device may announce or broadcast the snapshot ID in the blockchain network.

Figure 12A:
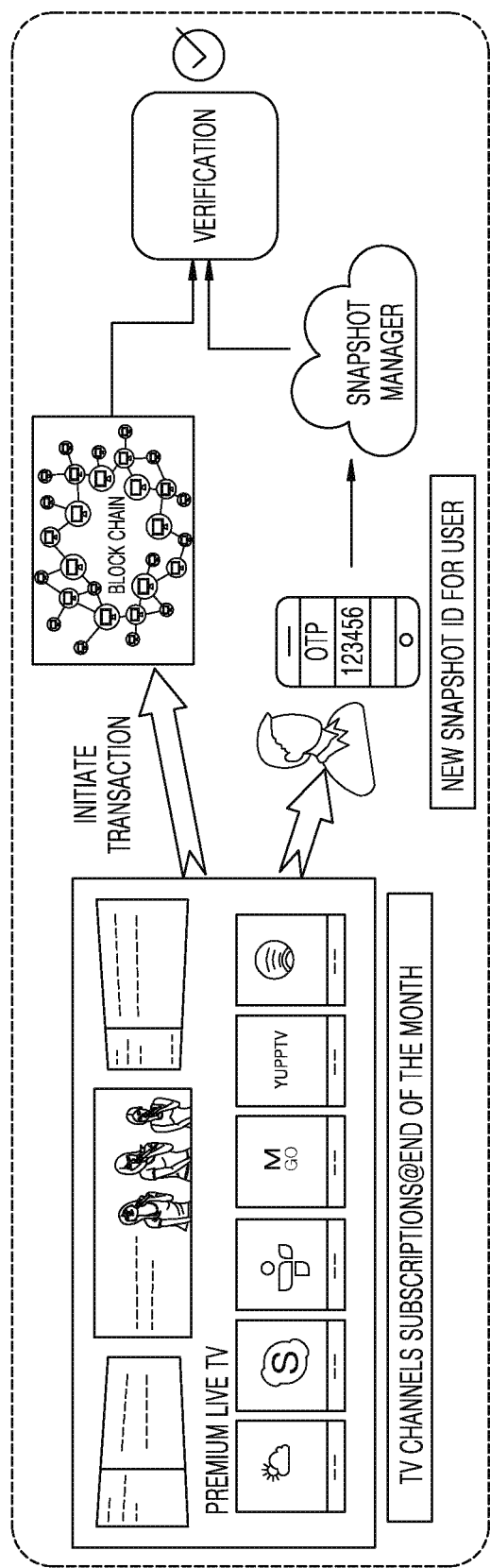
FIG. 12A illustrates an example scenario using snapshot manager for transaction in a blockchain network, according to an embodiment of the disclosure.

FIG. 12A illustrates an example scenario using snapshot manager for transaction in a blockchain network, according to an embodiment of the disclosure. In an embodiment, a user may need to subscribe to certain television channels. The user may transmit an OTP for a snapshot ID as a transaction ID to a snapshot manager. The generated snapshot ID may be broadcast to the blockchain network. The transaction may be executed if the authentication of the snapshot ID is performed successfully.

Figure 12B:
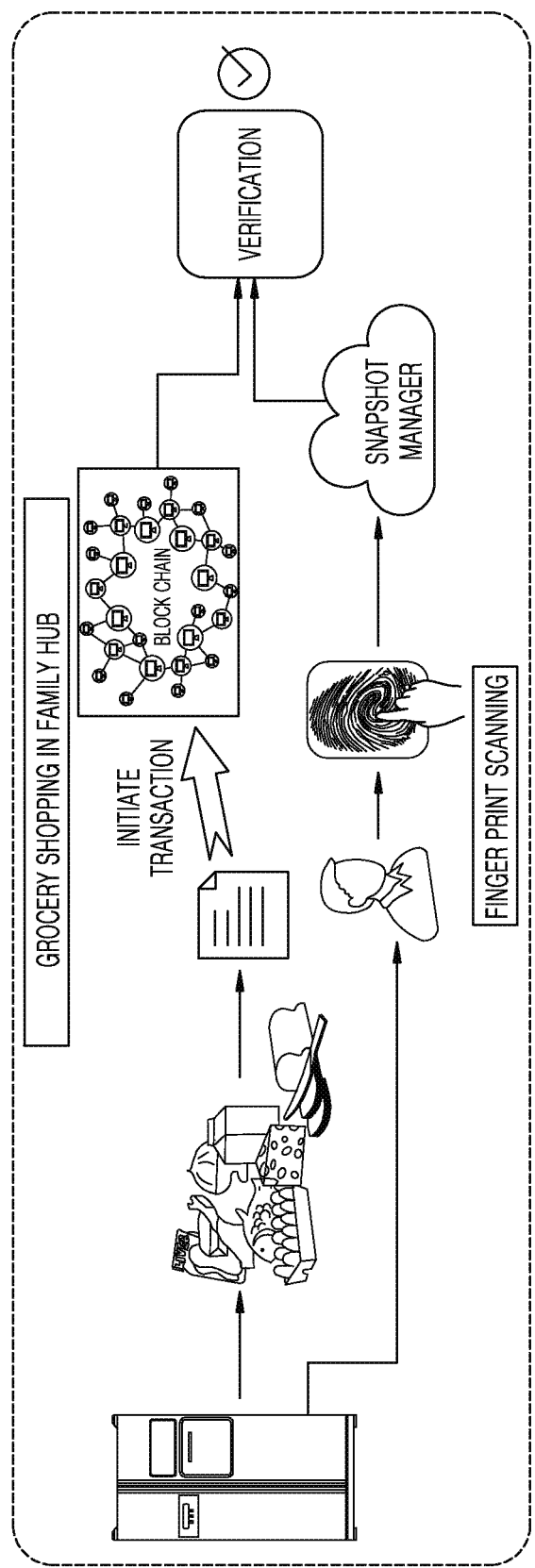
FIG. 12B illustrates an example scenario using snapshot manager for transaction in a blockchain network, according to an embodiment of the disclosure.

FIG. 12B illustrates an example scenario using snapshot manager for transaction in a blockchain network, according to an embodiment of the disclosure. In an embodiment, a user may purchase something to eat via on-line shopping. The user may transmit fingerprint data as user data stored in the user device and request for a transaction ID in the blockchain network.

Figure 13:
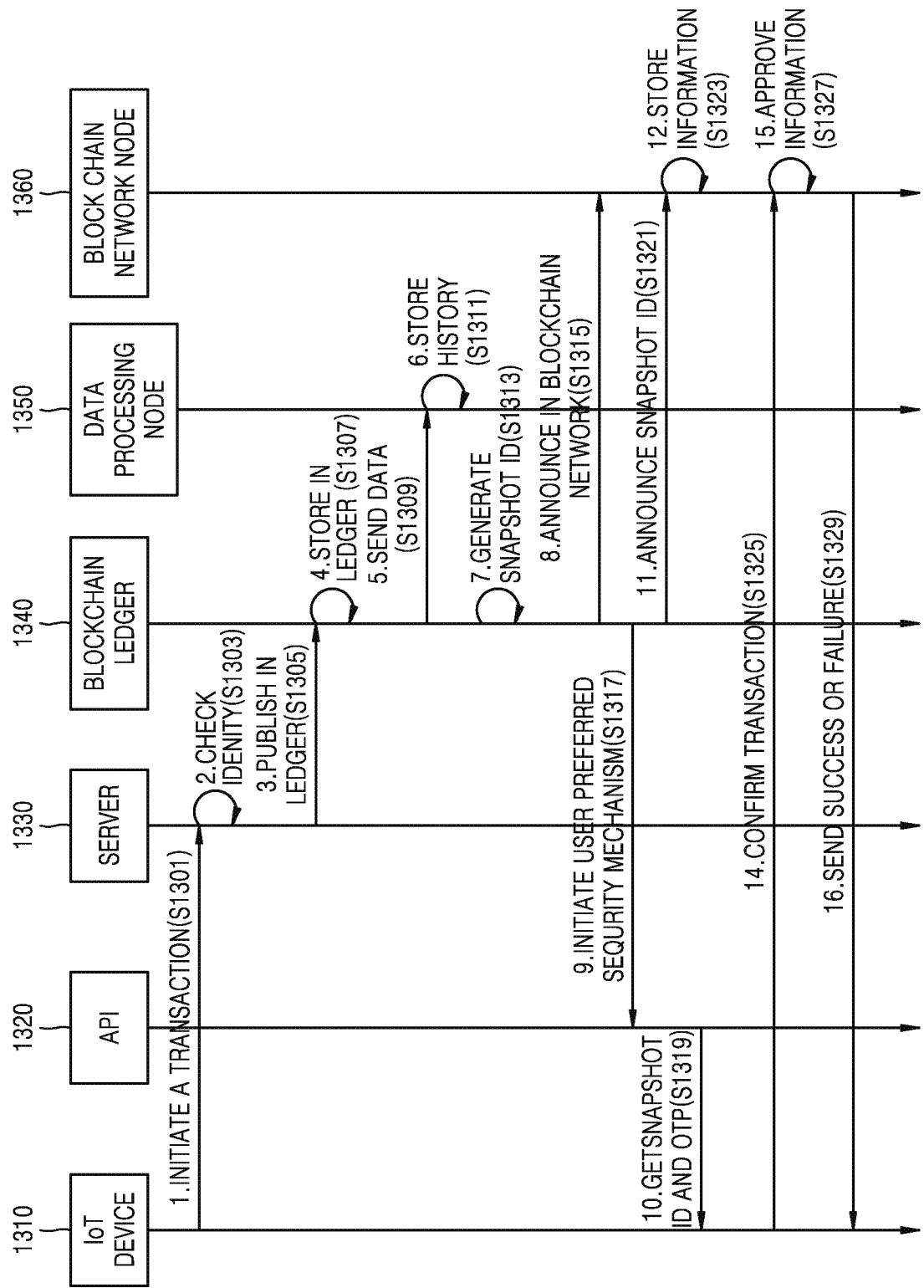
FIG. 13 illustrates a sequence diagram for performing user authentication using block chain network, according to an embodiment of the disclosure.

FIG. 13 illustrates a sequence diagram for performing user authentication using block chain network, according to an embodiment of the disclosure. In operation S1301, the IoT device 1310 may initiate a blockchain transaction by transmitting the identity information or user data to a server 1330. In operation S1303, the server 1330 may verify the identity or the user data of the IoT device 1310. In operation S1305, the server 1330 may publish the blockchain transaction in a blockchain ledger 1340. In operation S1307, the blockchain ledger 1340 may store the blockchain transaction. In operation S1309, the blockchain ledger 1340 may send data related to the blockchain transaction to a data processing node 1350. In operation S1311, the data processing node 1350 may store the blockchain transaction history. In operation S1313, the blockchain ledger 1340 may generate the snapshot ID with the user data or the identity information of the IoT device 1310. In operation S1315, the blockchain ledger 1340 may announce or broadcast the snapshot ID in the blockchain network node 1360. In operation S1317, the blockchain ledger 1340 may initiate a user preferred security mechanism (for example, two factor authentication) to perform user verification by transmitting the snapshot ID and the user data (or the identity of IoT device 1310) to an Application Interface (API) 1320. In operation S1319, the IoT device 1310 may get the snapshot ID. In operation S1321, the blockchain ledger 1340 may announce or broadcast snapshot ID along with the user data (or the identity of IoT device 1310) in the blockchain network node 1360. In operation S1323, the blockchain network node 1360 may store information such as the snapshot ID and/or the user data (or the identity of IoT device 1310). In operation S1325, the IoT device 1310 may request a confirmation of the blockchain transaction to the blockchain network node 1360. In operation S1327, the blockchain network node 1360 may approve the transaction by authenticating the snapshot ID and/or the user data (or the identity of IoT device 1310). In operation S1329, the blockchain network node 1360 may send a success notification or a failure notification regarding the blockchain transaction to the IoT device 1310. The success notification may be an approval notification of the blockchain transaction.

FIG. 14 illustrates a flow diagram for managing user authentication using block chain network, according to an embodiment of the disclosure.

A user device may include at least one processor to perform the following operations. In operation 1402, the user device such as an IoT device may request a snapshot ID from a remote server 208 by transmitting user data including at least one of one-time password, biometric data, context data, IoT routine data, or device metadata. In operation 1404, the user device may receive the snapshot ID generated based on the user data from a blockchain ledger. In operation 1406, the user device may initiate a blockchain transaction with the user information and a received snapshot ID in response to the request. The user information comprises at least one login credential. The user device may broadcast the initiated blockchain transaction to the block chain network associated with a blockchain server 206. In operation 1408, the user device may output a processed blockchain transaction data received from the blockchain server 206, based on authenticating the broadcasted snapshot ID.

FIG. 15 illustrates a flow diagram for broadcasting a snapshot ID in the blockchain network, according to an embodiment of the disclosure.

A blockchain ledger or a remote server 208 may include at least one processor to perform the following operations. In operation 1502, the blockchain ledger or the remote server 208 may generate a snapshot ID based on user data including at least one of the one-time password, biometric data, context data, IoT routine data, and/or device metadata received from the user device such as one of the IoT devices 202A-202N. In operation 1504, the blockchain ledger or the remote server 208 may transmit the generated snapshot ID to the user device. In operation 1506, the blockchain ledger or the remote server 208 may announce or broadcast the generated snapshot ID to the blockchain network associated with the blockchain server 206. The blockchain server 206 may authenticate the broadcasted blockchain transaction.

FIG. 16 illustrates a flow diagram for processing a blockchain transaction, according to an embodiment of the disclosure.

A blockchain server 206 may include at least one processor to perform the following operations. In operation 1602, the blockchain server 206 may receive the initiated blockchain transaction from the user device. In other words, the blockchain server 206 may receive transaction data regarding the blockchain transaction from a user device such as one of IoT devices 202A-202N In operation 1604, the blockchain server 206 may send a request for the snapshot ID to the remote server 208, if the snapshot ID corresponding to the received blockchain transaction, has not been broadcasted in the blockchain network associated with the blockchain server 206. The blockchain server 206 may check the availability of the snapshot ID before sending the request for the snapshot ID to the remote server 208. In operation 1606, the blockchain server 206 may process the received blockchain transaction in response to the authentication of the received snapshot ID associated with the blockchain transaction, with the broadcast snapshot ID by the remote server 208 or the blockchain ledger. That is, the blockchain server 206 may determine whether the snapshot ID associated with the received blockchain transaction from the user device corresponds to or is equivalent to the snapshot ID transmitted from the remote server 208. Based on the determination, the blockchain server 207 may authenticate the snapshot ID and approve the blockchain transaction.

FIG. 17 illustrates a flow diagram for authenticating the snapshot ID, according to an embodiment of the disclosure.

In operation 1702, the remote server 208 may verify user data associated with a user device such as the IoT devices 202A-202N based on the received request to generate snapshot ID. In operation 1704, the remote server 208 may generate the snapshot ID upon a successful verification of the user data.

The embodiments disclosed herein can be implemented through at least one software program running on at least one hardware device and performing network management functions to control the elements. The elements shown in FIG. 2 can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed is:

1. An apparatus for managing user authentication in a blockchain network, the apparatus comprising a hardware processor configured to:
   transmit, to a server, a request for a snapshot identifier (ID) and user data comprising routine data and at least one of a one-time password, biometric data, context data or device metadata, wherein the routine data comprises a behavior pattern of a user performed in an internet of things (IoT) network that includes the apparatus, and a route of the user in a predetermined area with a predetermined sequence within a predetermined time duration;
   receive the snapshot ID generated based on the user data and broadcast in the blockchain network by the server;
   initiate a transaction with the snapshot ID in the blockchain network comprising a blockchain server which authenticates the snapshot ID by comparing, by the block chain server, the snapshot ID with the broadcast snapshot ID; and
   output blockchain transaction data associated with the transaction based on the authentication of the snapshot ID.

2. The apparatus of claim 1, wherein the hardware processor is further configured to check whether the snapshot ID is available for the transaction, and
   wherein transmitting the request for the snapshot ID comprises transmitting the request for the snapshot ID based on the checking.

3. The apparatus of claim 1, wherein authenticating the snapshot ID comprises authenticating the snapshot ID with a new snapshot ID announced by the server.

4. The apparatus of claim 1, wherein the hardware processor is further configured to broadcast the transaction with the snapshot ID in the blockchain network.

5. The apparatus of claim 1, wherein the biometric data comprises at least one of user's fingerprint data, user's veins data, user's face recognition data, user's palm printing data, user's iris data, or user's voice data.

6. The apparatus of claim 1, wherein the context data comprises at least one of a still picture, a moving picture, usage pattern data of the apparatus, or applications usage pattern data of the apparatus.

7. The apparatus of claim 1, wherein the routine data comprises patterns of operating user devices in a predetermined sequence.

8. The apparatus of claim 1, wherein the device metadata comprises at least one of call history data, history data of emails, subscription to service history data, online shopping pattern data, or an unlock pattern data of the apparatus.

9. An apparatus for authentication in a blockchain network, the apparatus comprising a hardware processor configured to:
   receive, from a user device, a request for a snapshot identifier (ID) and user data comprising Internet of Things (IoT) routine data comprising routine data and at least one of a one-time password, biometric data, context data or device metadata, wherein the routine data comprises a behavior pattern of a user performed in an IoT network that includes the apparatus and a route of the user in a predetermined area with a predetermined sequence within a predetermined time duration;
   generate the snapshot ID based on the received user data;
   transmit the generated snapshot ID to the user device; and
   broadcast the snapshot ID to a blockchain server for authenticating the snapshot ID by comparing the transmitted snapshot ID and the broadcast snapshot ID.

10. The apparatus of claim 9, wherein the hardware processor is further configured to verify the user data based on the request, and
    wherein the generating of the snapshot ID comprises generating the snapshot ID based on the verifying the user data.

11. The apparatus of claim 10, wherein the verifying of the user data comprises checking an identity of the user device based on the user data.

12. The apparatus of claim 10, wherein the broadcasting of the snapshot ID comprises broadcasting the snapshot ID with the user data to the blockchain server for the authentication.

13. An apparatus for authentication in a blockchain network, the apparatus comprising a hardware processor configured to:
    receive a first snapshot identifier (ID) and user data comprising routine data and at least one of a one-time password, biometric data, context data or device metadata, wherein the routine data comprises a behavior pattern of a user performed in an Internet of Things (IoT) network that includes the apparatus, and a route of the user in a predetermined area with a predetermined sequence within a predetermined time duration included in a blockchain transaction data from a user device and broadcast in the blockchain network by a server;
    transmit a request for a second snapshot ID to a ledger in the blockchain network;
    receive the second snapshot ID from the ledger;
    determine whether the first snapshot ID corresponds to the second snapshot ID; and
    authenticate the first snapshot ID based on the determination.

14. The apparatus of claim 13, wherein the hardware processor is further configured to check whether the second snapshot ID is available due to a previous broadcasting of the second snapshot ID by the ledger.

15. The apparatus of claim 13, wherein the hardware processor is further configured to transmit an approval notification of a blockchain transaction based on the authentication.

* * * * *